No. 661,471. Patented Nov. 6, 1900.
C. HIBBERD & J. BARTON.
APPARATUS FOR INDICATING, ASSORTING, AND COUNTING COINS AND DELIVERING CHANGE.
(Application filed Sept. 6, 1898.)
(No Model.) 5 Sheets—Sheet 1.
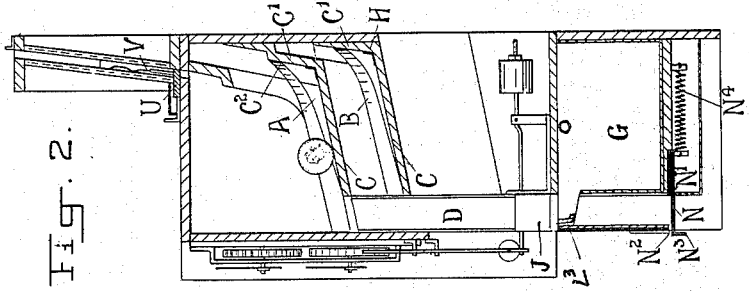
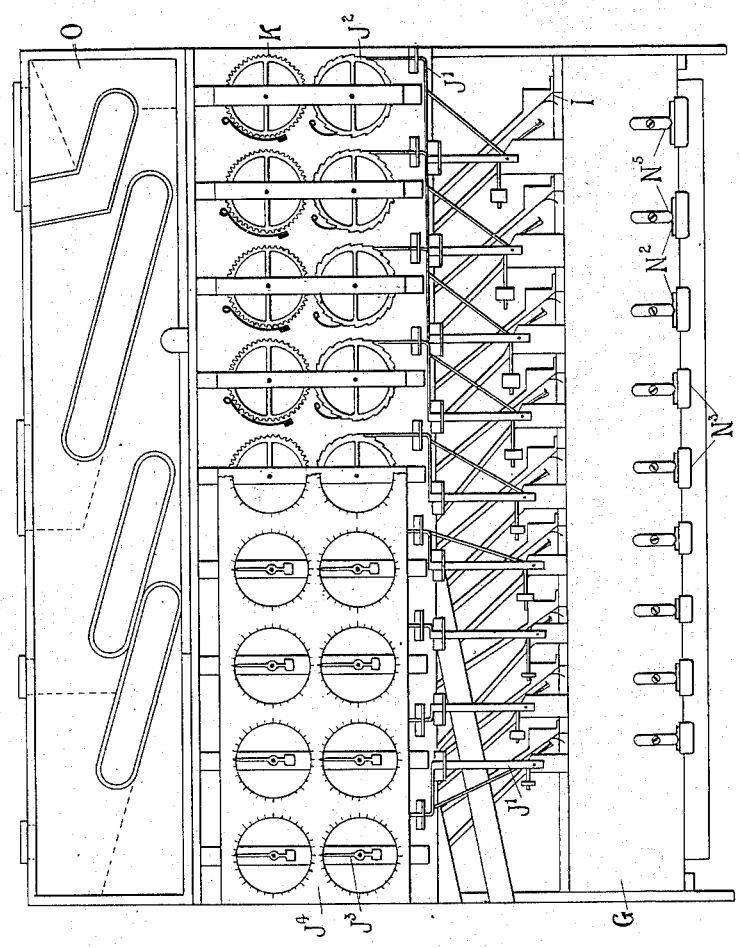
Witnesses
Inventors
Charles Hibberd
Joshua Barton No. 661,471. Patented Nov. 6, 1900.
C. HIBBERD & J. BARTON.
APPARATUS FOR INDICATING, ASSORTING, AND COUNTING COINS AND DELIVERING CHANGE.
(Application filed Sept. 6, 1898.)
(No Model.) 5 Sheets—Sheet 2.

Witnesses
Inventors
Charles Hibberd
Joshua Barton

No. 661,471. Patented Nov. 6, 1900.
C. HIBBERD & J. BARTON.
APPARATUS FOR INDICATING, ASSORTING, AND COUNTING COINS AND DELIVERING CHANGE.
(Application filed Sept. 6, 1898.)
(No Model.) 5 Sheets—Sheet 3.
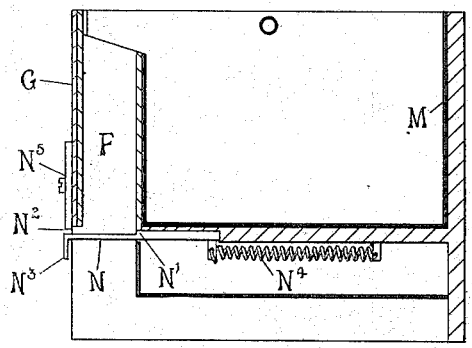
Fig. 7.
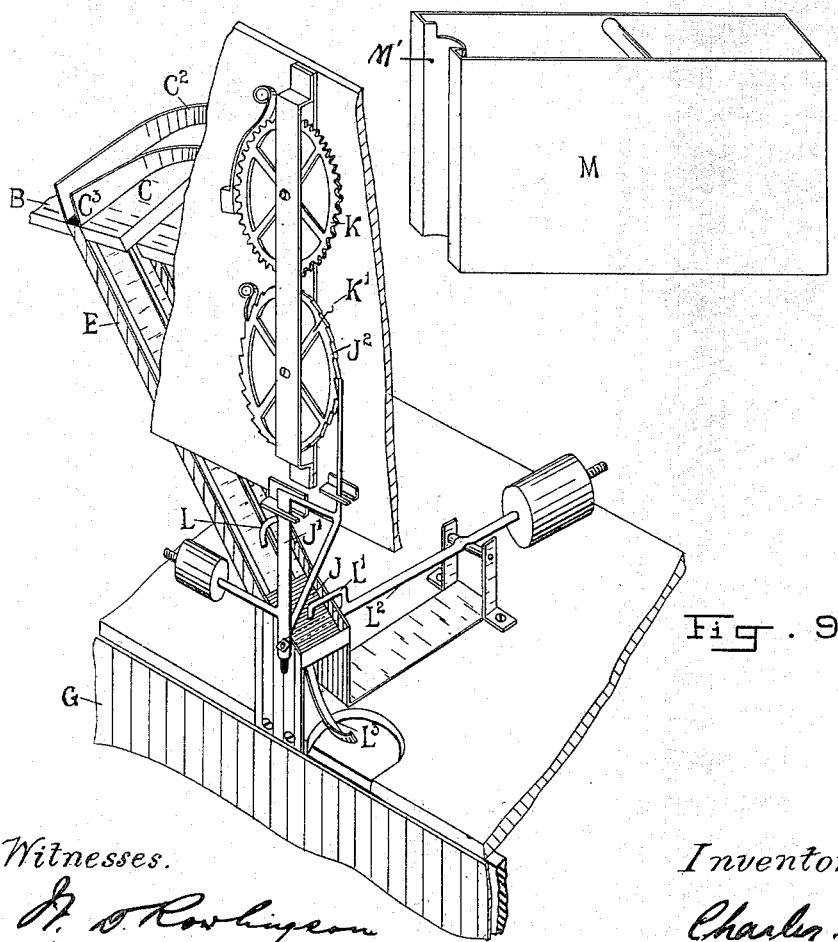
Fig. 8.
Fig. 9.
Witnesses.
Inventors.
Charles Hibberd
Joshua Barton.

No. 661,471. Patented Nov. 6, 1900.
C. HIBBERD & J. BARTON.
APPARATUS FOR INDICATING, ASSORTING, AND COUNTING COINS AND DELIVERING CHANGE
(Application filed Sept. 6, 1898.)
(No Model.) 5 Sheets—Sheet 4.

No. 661,471. Patented Nov. 6, 1900.
C. HIBBERD & J. BARTON.
APPARATUS FOR INDICATING, ASSORTING, AND COUNTING COINS AND DELIVERING CHANGE.
(Application filed Sept. 6, 1898.)

(No Model.) 5 Sheets—Sheet 5.

WITNESSES:
INVENTORS
Charles Hibberd & Joshua Barton.
BY R. S. C. Caldwell,
ATTORNEY

UNITED STATES PATENT OFFICE.

CHARLES HIBBERD AND JOSHUA BARTON, OF LONDON, ENGLAND.

APPARATUS FOR INDICATING, ASSORTING, AND COUNTING COINS AND DELIVERING CHANGE.

SPECIFICATION forming part of Letters Patent No. 661,471, dated November 6, 1900.

Application filed September 6, 1898. Serial No. 690,371. (No model.)

*To all whom it may concern:*

Be it known that we, CHARLES HIBBERD, of 59 Rectory Grove, Clapham, London, in the county of Surrey, and JOSHUA BARTON, of Meadow Bank, Cranford, London, in the county of Middlesex, England, subjects of the Queen of Great Britain and Ireland, have invented a certain new and useful Improved Apparatus for Indicating, Assorting, and Counting Coins and Delivering Change, of which the following is a specification.

This invention is designed to provide an apparatus in which the coins for the amount of purchase and the coin tendered when change is required are exhibited to the purchaser, after which they are caused to simultaneously disappear and pass into separators to be assorted according to their respective values, the amount of the purchases or receipts being recorded on dials before the coins enter the cash-drawer, while the tendered coins pass direct into it without being registered. The apparatus is also furnished with means for speedily obtaining change from the cash-drawer and also with a chamber for bank-notes and such like, from which the contents cannot be surreptitiously removed.

The invention will be readily understood upon reference to the accompanying drawings, in which—

Figure 3:
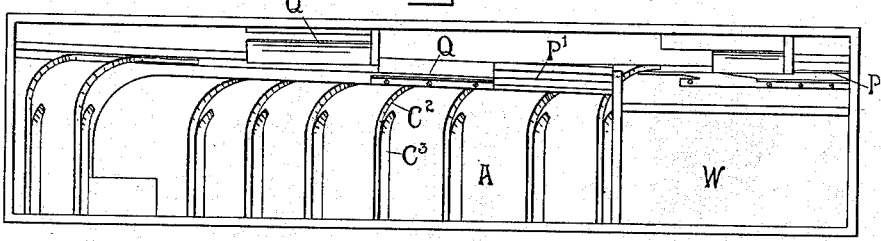
Figure 4:
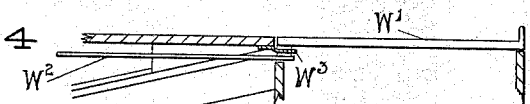
Figure 5:
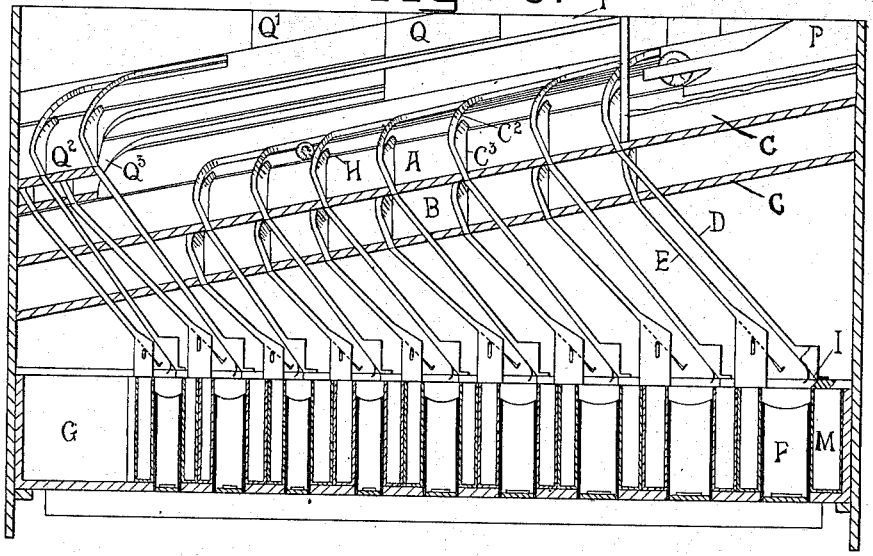
Figure 6:
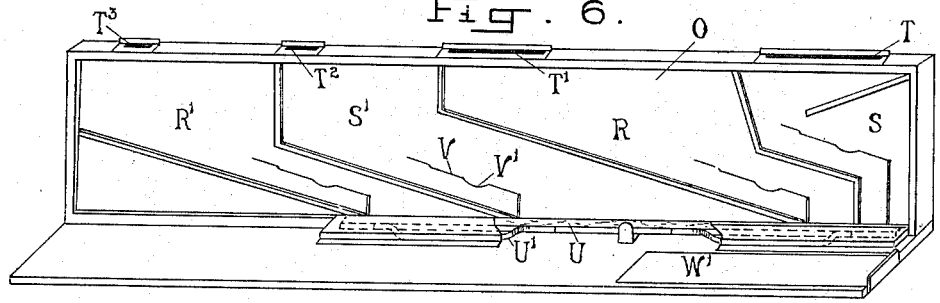
Figure 10:
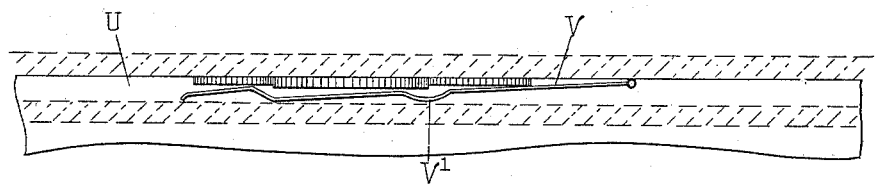
Figure 11:
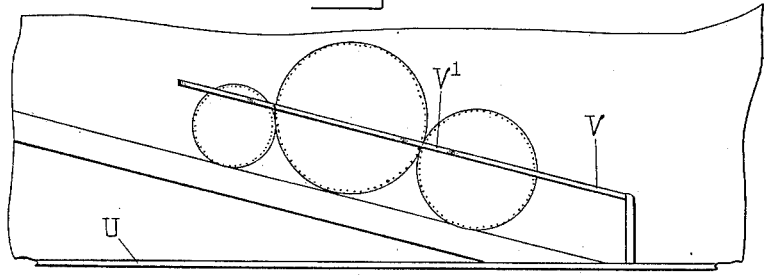
Figure 12:
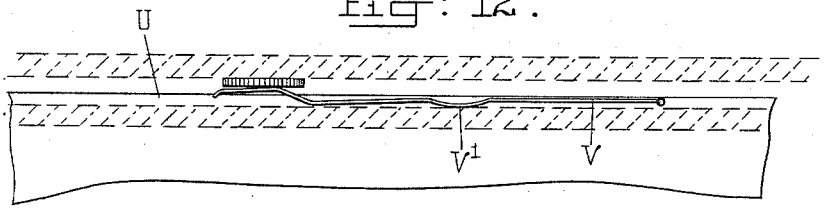
Figure 13:
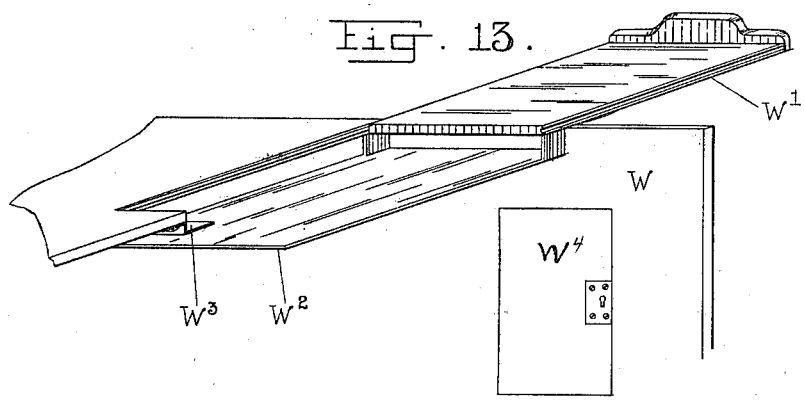
Figure 14:
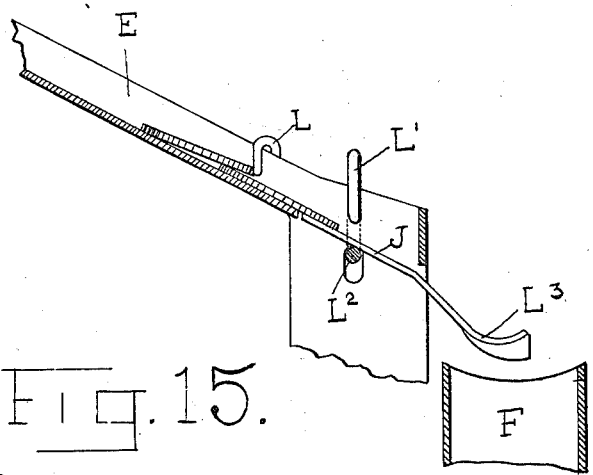
Figure 15:
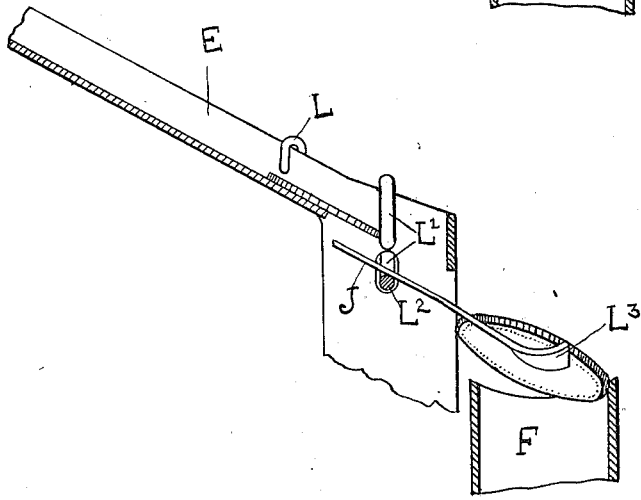

Figure 1 is a front elevation of the apparatus with the front panel and also a portion of the registering-dials removed. Fig. 2 is a transverse section. Fig. 3 is a plan of the upper assorter. Fig. 4 is a fragment view showing the cover for the bank-note chamber. Fig. 5 is a section through the frame and cash-drawer and shows the arrangement of the assorters and chutes. Fig. 6 is a perspective view of the coin-indicator with the front glass panel removed. Fig. 7 is a transverse section through the cash-drawer, on an enlarged scale. Fig. 8 is a perspective view of one of the removable compartments of the cash-drawer. Fig. 9 is a perspective view of the registering mechanism for one denomination of coin. Fig. 10 is an enlarged detail view of the means for preventing more than a limited number of coins passing into the machine at a time. Fig. 11 is an elevation of the same. Fig. 12 is a similar view to Fig. 10, but shows the releasing-shutter drawn back and the wire, while allowing two coins to pass into the machine, holding one coin until it is again in its normal position. Fig. 13 shows in perspective and partly in section the sliding door in the open position for preventing the surreptitious removal of bank-notes and the like. Fig. 14 is a longitudinal sectional view of one of the chutes E, illustrating the arrangement of parts for permitting a solitary coin to pass onto the movable plate J; and Fig. 15 is a similar view showing the parts in position for discharging one coin from the movable plate and preventing another coin from passing upon said plate until its normal position is resumed.

In carrying out our invention we arrange within a suitable case two assorters A and B, one above the other, the upper one, A, being for the coins tendered and the lower one, B, for the receipts. These assorters each consists of a longitudinally and transversely inclined platform C and a rearwardly-inclined back C', furnished with wire or metal-strip runners $C^2$, against which the coins rest when rolling down the inclined platform. The said runners correspond in number to the various size coins to be separated, so that each denomination of coin has its particular runner. They are placed in such position that the edge portion only of the coins will rest against their respective runners, so that the coins cannot stick to the back. The largest size coin is first diverted, then the next largest, and so on. These runners for both assorters are curved outward and are furnished with guide-pieces $C^3$, so that the coins will pass on their edge through the slots made in the platforms onto chutes D and E, which direct them to the receivers F in the front portion of the cash-drawer G. A metallic path H for the coins is secured to each assorter to enable the coins to roll easily.

The chutes D from the upper assorter for the coins tendered have simply an opening at I, inclined inward to allow the coins to pass direct into the receivers F, while at the lower end of each of the chutes E for the receipts is arranged a counterbalanced plate J, Fig. 9, which connects with a suitably-supported weighted pawl-lever J' for turning the toothed wheel $J^2$, which carries the hand or pointer $J^3$ for indicating upon the dial $J^4$ the number or amount of coins (in the receipts) that have passed into the cash-drawer. An additional wheel K, furnished with a pointer, is arranged above the wheel $J^2$ and is moved one tooth by the striker K' at each revolution of the said wheel $J^2$. Any suitable multiplicity of these wheels may be used, if desired.

The chutes aforesaid may be ribbed or corrugated longitudinally to prevent the coins sticking to the same. They may also be made zigzag in lieu of the form shown, especially those for the receipts, so as to break the rush of the coins as they pass onto the plates J.

Suitably-curved arms L, Fig. 9, fixed to the sides of the chutes E for the receipts, are arranged to prevent more than one coin at a time passing onto its respective plate J. Similar arms L', secured to the rods $L^2$, which are attached to the said plates J, form stops for succeeding coins when the plates J are depressed by the weight of the coins passing over them.

$L^3$ are extended portions of the plates J for directing the coins into the receivers as they depress and slide off the said plates. The said receivers F for the various coins are formed, preferably, of metal tubing secured to the inner side of the drawer-front. They correspond in size to the coins which they are intended to hold and are deep enough to hold a suitable number of coins piled one above the other. Should additional coins be passed to these receivers when they are full, they will be diverted into the detachable compartments M in the drawer. This is effected by forming the tops of the receivers F at an inclination and directing the coins by the extensions $L^3$ as they fall from the chutes toward the lowest portion of the inclination, so that when the top coins in the receivers are flush with this lowest portion other coins following will slide off the top coin into the compartment M. These compartments have grooved ends M' to partially surround the receivers and are made detachable, so that they can be removed one at a time and the various denominations of coins kept separate.

In order that the coins can be withdrawn from the said receivers, sliding bars N, having raised portions N' equal to the thickness of the relative coins, are arranged in suitable guides at the bottoms of the receivers, so as to draw the lowest coin through the slots $N^2$, formed in the drawer-front. The said bars are suitably bent at their outer ends to form finger-pieces $N^3$, by means of which they are pulled out, and they are connected at their inner ends with the spiral springs $N^4$, which return them to their normal position after use.

Suitable movable stops $N^5$ are arranged above the coin-slots $N^2$ to regulate the width of the same, so that only one coin at a time can pass through each slot; but should a bent coin be in one of the receivers and unable to pass through the limited opening the stops can be raised so as to increase the size of the opening and allow the offending coin to be easily withdrawn, after which it is readjusted to its original position.

The indicator O for exhibiting to the purchaser the coins for the amount of the purchase and also the coin tendered when change is required is arranged directly over the assorters before mentioned, the outlets for the coins being placed over suitable throats P, P', Q, and Q', which lead to the assorters. The throats P and P' communicate with the assorters A and B, while the throats Q and Q' communicate with the assorters $Q^2$ and $Q^3$, which are intended in this instance for gold coins only. The said indicator consists of a glass-paneled case having four compartments formed by longitudinally-inclined strips. Two of these compartments R and R' are for the receipts and the other two, S and S', for the coin tendered, it being necessary for the gold coins to have separate compartments, as they are assorted separately. The coins are dropped into the respective compartments through the slots T, T', $T^2$, and $T^3$, formed in the top of the case. They are prevented from passing into the assorters until desired by a sliding shutter U, which is forced over the throats leading to the said assorters by the springs U'. To release the coins from the indicator, it is only necessary to draw the shutter U outward, when the coins will drop into their respective assorters.

In order to prevent more than one or two coins at a time from each compartment passing into the assorters, so as to minimize the probability of the apparatus getting blocked, the wires V are extended from the said shutter into the compartments and indented in one direction at their middle points V' and in the opposite direction at their outer ends, so that when the shutter is pulled out the bent portions V' of the wires V bind against the near glass panel. Consequently the outer ends are forced against the far panel against which the coins rest. Thus when the shutter is pulled out those coins which are beyond the wires are retained in the indicator until those that are within the same are released. The drawings show three coins, Fig. 10, in the indicator. By pulling back the shutter two coins disappear, Fig. 12, the remaining one being held by the wire until the shutter is again released, when it will occupy the space just left by the other coins.

A chamber W is formed in the apparatus to hold bank-notes and such like. It is fitted with a sliding door W' and movable platform $W^2$, connected therewith, Figs. 4 and 13, constructed in such a manner that when the said door is in the open position the platform covers the orifice of the chamber, but when in the closed position the platform is clear of the chamber. Thus to deposit a bank-note in the chamber the door should be opened and the note placed on the platform. By closing the door the platform is slid from beneath the note, which is prevented from remaining thereon by the strip W³, against which it comes in contact, and causes it to fall through the space between the platform and the door into the chamber, from whence it cannot be surreptitiously abstracted. A side door W⁴, fitted with a suitable lock, is, however, provided, by which access to the chamber may be gained when it is desired to remove the notes.

The operation of the apparatus is as follows: When a coin is tendered in the purchase of goods and change is required, the said coin, if silver or copper, is placed in the slot T in the indicator and the equivalent of the coin is withdrawn from the cash-drawer. The amount of the purchase is then placed in the slot T' and the change is handed to the purchaser. By drawing the shutter U outward the coins are released from the indicator and pass into their respective assorters, the coin tendered passing through the assorter A, down the chute D, and into its proper receiver F in the cash-drawer, while the amount of the purchase passes through the assorter B, down its respective chute E, over the plate J, which it depresses, and into its proper receiver F. The movement of the said plate causes the lever J' to turn the relative wheel J² one tooth and shows on the dial the amount of the receipts.

Having now described our invention, what we claim as new, and desire to secure by Letters Patent, is—

1. In a device of the character described, a chute, a counterbalanced plate in the chute adapted to be depressed by the passage of a coin thereover, a curved arm carried by the plate to prevent succeeding coins passing onto the plate while said plate is depressed, a second curved arm extending over the chute to prevent two coins passing at a time, a pawl connected to the plate and a registering means engaged by the pawl, substantially as described.

2. In a device of the character described, a chute, a counterbalanced plate in the chute adapted to be depressed by the passage of a coin thereover, a curved arm carried by the plate to prevent succeeding coins passing onto the plate while said plate is depressed, a pawl connected to the plate, and a registering means engaged by the pawl, substantially as described.

3. In a device of the character described, a chute, a counterbalanced plate in the chute adapted to be depressed by the passage of a coin thereover, a curved arm carried by the plate to prevent succeeding coins passing onto the plate while said plate is depressed, a second curved arm extending over the chute to prevent two coins passing at a time, a pawl connected to the plate, a registering means engaged by the pawl, a receiver located beneath the plate to receive the coins therefrom, said receiver being provided with an inclined mouth, and a curved extension on the plate to direct the falling coins toward the lowest portion of the mouth of the receiver, substantially as described.

4. In a device of the character described, a case comprising transparent panels, inclined strips between the panels forming chutes for coins, a sliding shutter to open and close the space between the panels, and a wire connected to the shutter and extending up the chute, said wire having an indentation in one direction at an intermediate point and an indentation in the opposite direction near its upper extremity, substantially as described.

5. In a device of the character described, a chute, a counterbalanced plate forming part of the bottom thereof, a curved arm carried by the plate to prevent succeeding coins passing onto the plate while said plate is depressed, a curved extension on the plate, a pawl connected to the plate and a registering means engaged by the pawl, substantially as described.

6. In a device of the character described, a separator for coins tendered, a second separator for coins of purchase, suitable receivers for the coins, chutes leading from both separators to each receiver, and registering means connected with the chute leading from the second separator, substantially as described.

7. In a device of the character described, a chute, a counterbalanced plate therein adapted to be depressed by the passage of a coin, a pawl connected to the plate, and a registering means engaged by the pawl, a receiver having an inclined mouth located beneath the plate to receive coins therefrom, and a curved extension on the plate to direct the falling coins toward the lowest portion of the receiver-mouth, substantially as described.

In witness whereof we have hereunto set our hands in the presence of two witnesses.

CHARLES HIBBERD.
JOSHUA BARTON.

Witnesses:
  W. D. ROWLINGSON,
  J. WYETH.